(12) United States Patent
Coughlan

(10) Patent No.: US 12,412,171 B2
(45) Date of Patent: *Sep. 9, 2025

(54) SHORT TRANSACTION IDENTIFIER COLLISION DETECTION AND RECONCILIATION

(71) Applicant: nChain Licensing AG, Zug (CH)

(72) Inventor: Steven Patrick Coughlan, London (GB)

(73) Assignee: nChain Licensing AG, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,834

(22) Filed: Jul. 12, 2024

(65) Prior Publication Data

US 2024/0370860 A1    Nov. 7, 2024

Related U.S. Application Data

(63) Continuation of application No. 17/602,174, filed as application No. PCT/IB2020/053436 on Apr. 10, 2020, now Pat. No. 12,073,391.

(30) Foreign Application Priority Data

Apr. 12, 2019 (GB) .................................. 1905221.6

(51) Int. Cl.
*G06Q 20/38* (2012.01)
*G06Q 20/06* (2012.01)
*G06Q 20/22* (2012.01)
(Continued)

(52) U.S. Cl.
CPC ....... *G06Q 20/3827* (2013.01); *G06Q 20/065* (2013.01); *G06Q 20/223* (2013.01);
(Continued)

(58) Field of Classification Search
CPC ............ G06Q 20/3827; G06Q 20/065; G06Q 20/223; G06Q 20/3825; H04L 9/3239;
(Continued)

(56) References Cited

U.S. PATENT DOCUMENTS 8,706,701 B1 * 4/2014 Stefanov ................. G06F 16/13
713/160
10,984,134 B2 4/2021 Setty
(Continued)

FOREIGN PATENT DOCUMENTS

WO    2018145168 A1    8/2018

*Primary Examiner* — Michael A Keller
(74) *Attorney, Agent, or Firm* — Messner Reeves LLP

(57) ABSTRACT

Methods and devices for resolving a collision in short transaction identifiers in a blockchain network. The method may include receiving a set of short transaction identifiers from a sending node. The receiving node locates a corresponding full transaction identifier for each short transaction identifier in a mempool. For at least one short transaction identifier, the receiver identifies a collision. It then sends a message to the sending node requesting resolution of the collision regarding the at least one short transaction identifier, and receives collision resolution data from the sending node to enable identification of a valid corresponding full transaction identifier for the at least one short transaction identifier. The receiver may send intermediate Merkle tree hashes with its request for resolution, and the collision resolution data may include information identifying which of the hashes is incorrect.

20 Claims, 12 Drawing Sheets

(51) Int. Cl.
*H04L 9/32*      (2006.01)
*H04L 9/00*      (2022.01)

(52) U.S. Cl.
CPC ....... *G06Q 20/3825* (2013.01); *H04L 9/3239* (2013.01); *H04L 9/3247* (2013.01); *H04L 9/3265* (2013.01); *H04L 9/50* (2022.05); *H04L 2209/56* (2013.01)

(58) Field of Classification Search
CPC ....... H04L 9/3247; H04L 9/3265; H04L 9/50; H04L 2209/56; H04L 9/3236
See application file for complete search history.

(56) References Cited

U.S. PATENT DOCUMENTS

| | | |
|---|---|---|
| 11,368,286 B1 | 6/2022 | Wang |
| 11,487,886 B2 | 11/2022 | Koorella et al. |
| 2012/0030468 A1* | 2/2012 | Papamanthou ....... H04L 9/3026 713/168 |
| 2018/0013567 A1* | 1/2018 | Davis .................. H04L 9/0637 |
| 2018/0307857 A1 | 10/2018 | Beecham et al. |
| 2018/0323980 A1 | 11/2018 | Ahn et al. |
| 2019/0034465 A1 | 1/2019 | Shimamura |
| 2019/0082007 A1 | 3/2019 | Klarman et al. |
| 2019/0340379 A1 | 11/2019 | Beecham |
| 2020/0119936 A1 | 4/2020 | Balasaygun et al. |
| 2020/0328892 A1 | 10/2020 | Gangal |
| 2021/0182895 A1 | 6/2021 | Sears |
| 2021/0209070 A1 | 7/2021 | Latorre et al. |
| 2021/0209077 A1 | 7/2021 | Snellman et al. |
| 2022/0094791 A1 | 3/2022 | Moller et al. |
| 2022/0191037 A1 | 6/2022 | Hassanzadeh Nazarabadi |

\* cited by examiner

| Field size (Bytes) | Name | Data type | Description |
|---|---|---|---|
| 4 | Version | int32_t | Block version information (note, this is signed) |
| 32 | prev_block | char[32] | The hash value of the previous block this particular block references |
| 32 | merkle_root | char[32] | The reference to a Merkle tree collection which is a hash of all transactions related to this block |
| 4 | timestamp | uint32_t | A Unix timestamp recording when this block was created (Currently limited to dates before the year 2106) |
| 4 | bits | uint32_t | The calculated difficulty target being used for this block |
| 4 | nonce | uint32_t | The nonce used to generate this block. This variable is iterated until the hash of the block header |
| 1+ | txn_count | varint | Number of transaction entries |
| ? | txns | tx[] | Block transactions, in format of 'tx' command |

FIG. 1

SHORT TRANSACTION IDENTIFIER COLLISION DETECTION AND RECONCILIATION

CROSS REFERENCE TO RELATED APPLICATIONS

This application is a continuation of U.S. application Ser. No. 17/602,174 filed Oct. 7, 2021, which is the U.S. National Stage filing of International Application No. PCT/IB2020/053436 filed Apr. 10, 2020, which claims the benefit of United Kingdom Patent Application No. 1905221.6, filed Apr. 12, 2019, the contents of all of which are incorporated herein by reference in their entireties.

TECHNICAL FIELD

The present disclosure relates to blockchain networks and, in particular, to the propagation of blocks amongst miner nodes.

BACKGROUND

In proof-of-work blockchain systems, when a miner finds a valid block it tries to quickly communicate its success to all other miners. This involves propagating information regarding the block through the blockchain network to all the mining nodes. In some cases, this may involve sending the full block data. In some cases, this may involve sending block header and transaction list information. Receiving miners validate the new block by hashing the header and confirming it matches the hash value provided by the successful miner.

As blocks increase in size and transaction count, delay in block propagation can exacerbate the problems of temporary forks and orphan blocks. These situations are costly to miners and to the system overall.

It may be advantageous when propagating block data to devise methods and systems for reducing the bandwidth consumed by block data and improving the speed of propagation; however, such methods and system may introduce the possibility of collisions that require efficient resolution.

BRIEF DESCRIPTION OF THE DRAWINGS

Reference will now be made, by way of example, to the accompanying drawings which show example embodiments of the present application and in which:

FIG. 1 shows an example block structure for a blockchain network;

Like reference numerals are used in the drawings to denote like elements and features.

DETAILED DESCRIPTION OF EXAMPLES

Figure 2:
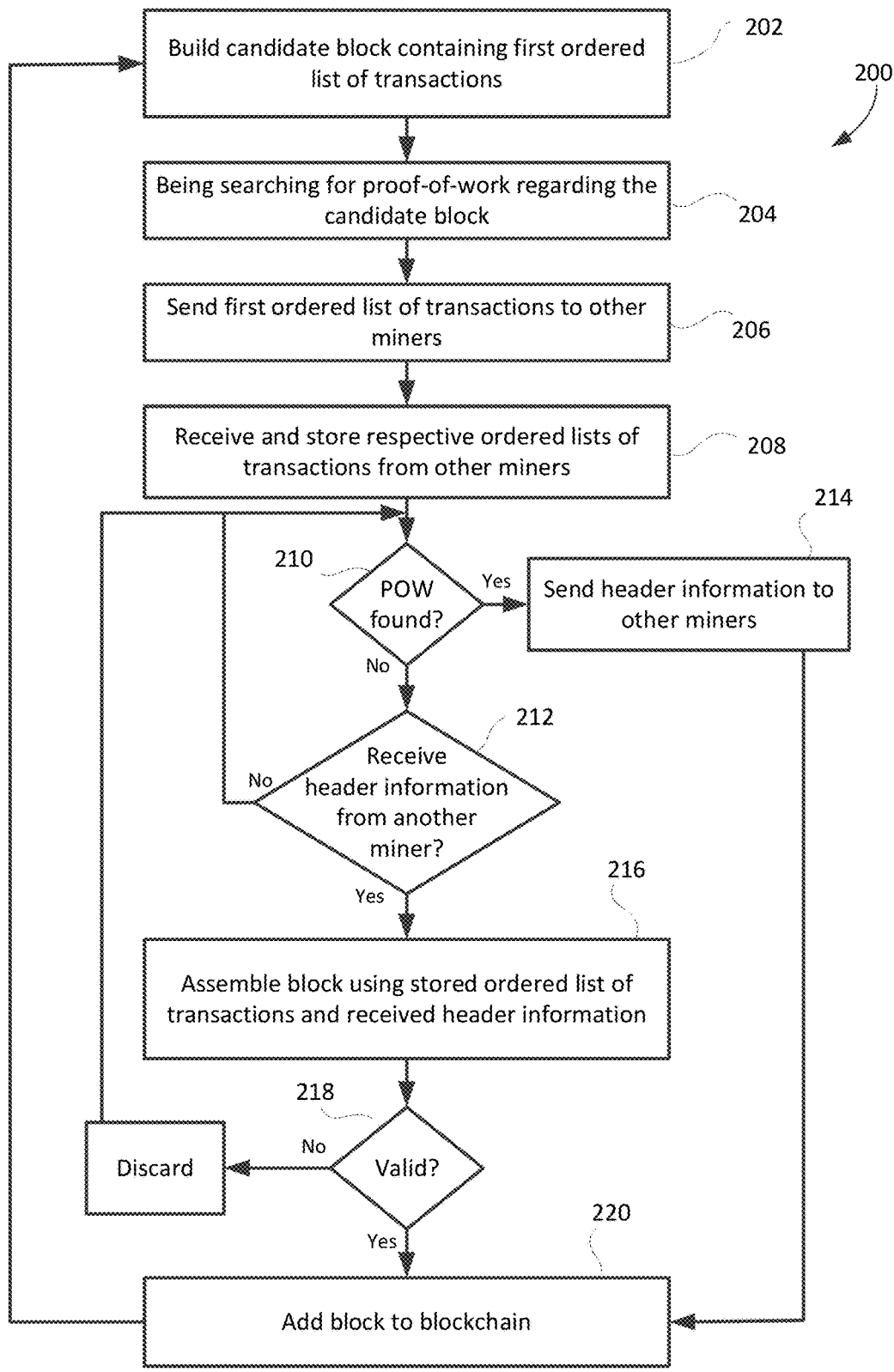
FIG. 2 shows a flowchart of an example method of block propagation.

In one aspect, there may be provided a computer-implemented method of resolving short transaction identifier collision in a blockchain network. The method may include receiving block data from a sending node, including a block Merkle root and a set of short transaction identifiers from a sending node; for each short transaction identifier, locating a corresponding full transaction identifier in a mempool; calculating a Merkle tree based on the full transaction identifiers, the Merkle tree having a Merkle root; determining that the calculated Merkle root does not match the block Merkle root; sending, to the sending node, Merkle tree hashes from an intermediate layer of the Merkle tree; receiving, from the sending node, resolution data identifying which of the Merkle tree hashes is incorrect; and repeating the sending of Merkle tree hashes and receiving of resolution data until a collision is resolved.

In some implementations, each short transaction identifier may be a truncation of its corresponding full transaction identifier.

In some implementations, the resolution data may include a flag for each of the Merkle tree hashes for the intermediate layer indicating whether that Merkle tree hash is valid.

In some implementations, the resolution data may include full transaction identifiers for a portion of a bottom layer of the Merkle tree.

In some implementations, the intermediate layer may be a layer of the Merkle tree between an identified unmatched Merkle hash and a bottom layer of the Merkle tree. In some cases, the method may include selecting the intermediate layer.

In some implementations, the Merkle tree hashes may include partial Merkle tree hashes.

In some implementations, receiving block data may include receiving, from the sending node, a pre-emptive set of Merkle tree hashes from a selected layer of the Merkle tree.

In a further aspect, the present application provides a computer-implemented method of resolving short transaction identifier collision in a blockchain network. The method may include receiving a set of short transaction identifiers from a sending node; for each short transaction identifier, locating a corresponding full transaction identifier in a mempool, wherein locating includes, for at least one short transaction identifier, identifying a collision; sending a message to the sending node requesting resolution of the collision regarding the at least one short transaction identifier; and receiving collision resolution data from the sending node to enable identification of a valid corresponding full transaction identifier for the at least one short transaction identifier.

In some implementations, sending may include sending a resolution request message containing the at least one short transaction identifier.

In some implementations, the collision resolution data may include the valid corresponding full transaction identifier.

In yet another aspect, the present application describes a computer-implemented method of resolving short transaction identifier collision in a blockchain network. The method may include determining a set of short transaction identifiers corresponding to full transaction identifiers stored in a mempool and confirming that none of the short transaction identifiers in the set result in a collision within the mempool; sending block data to a receiving node, including a block Merkle root and the set of short transaction identifiers; receiving, from the receiving node, Merkle tree hashes from an intermediate layer of a Merkle tree; comparing the received Merkle tree hashes with locally-generated Merkle tree hashes for the intermediate layer of the Merkle tree to identify which of the received Merkle tree hashes is incorrect; and sending resolution data to the receiving node identifying which of the received Merkle tree hashes is incorrect and providing one or more full transaction identifiers to enable correction of the incorrect Merkle tree hash.

In some implementations, each short transaction identifier is a truncation of its corresponding full transaction identifier.

In some implementations, the resolution data includes a flag for each of the received Merkle tree hashes for the intermediate layer indicating whether that Merkle tree hash is valid.

In some implementations, the resolution data includes full transaction identifiers for a portion of a bottom layer of the Merkle tree.

In some implementations, the received Merkle tree hashes include partial Merkle tree hashes.

In some implementations, the receiving Merkle tree hashes and the sending resolution data are repeated for further layers of the Merkle tree until the receiving node has correct full transaction identifiers for calculating the block Merkle root for a block.

In some implementations, sending resolution data may include sending data identifying which of the received Merkle tree hashes is incorrect; receiving further Merkle tree hashes from the receiving node from a layer lower in the Merkle tree than the intermediate layer; identifying one of the further Merkle tree hashes not matching a corresponding locally-generated Merkle tree hash; and sending the one or more full transaction identifiers used in generating the corresponding locally-generated Merkle tree hash.

In another aspect, there may be provided a computing device for resolving short transaction identifier collision in a blockchain network. The computing device may include memory, one or more processors, and computer-executable instructions that, when executed, cause the processors to carry out one or more of the methods described herein.

In yet another aspect, there may be provided a computer-readable medium storing processor-executable instructions for resolving short transaction identifier collision in a blockchain network, the processor-executable instructions including instructions that, when executed by one or more processors, cause the processors to carry out at least one of the methods described herein.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application will refer to hashing or a hash function, which is intended to include any one of a number of cryptographic hash functions that, when applied to an arbitrary set of data or "message", deterministically produce a unique fixed-length alphanumeric string. The result of a hash function may be called a hash value, fingerprint, hash result, or equivalent. Examples include, but are not limited to, SHA-2, SHA-3, and BLAKE2. Any reference below to a miner hashing a block or a candidate block will be understood to mean applying a cryptographic hash function to the header portion of the candidate block.

In this document the term 'blockchain' is understood to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin, as exemplified by the Bitcoin SV protocol, may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

The blockchain is implemented over a network of nodes. Each node is a computing device with network connectivity and executing software that carries out the applicable blockchain protocol. Nodes validate transactions and propagate them to other nodes in the network. Specialized network nodes, termed "mining nodes" or "miners", collect a set of unconfirmed transactions, i.e. pending transactions, into a block and attempt to "mine" the block. Mining, in these examples, refers to solving a proof-of-work (POW) before any other miner in the network succeeds in solving a proof-of-work for their respective block. In the Bitcoin example, a POW involves hashing a block header containing a nonce until the result is below a threshold value set by a difficultly parameter. The nonce is repeated incremented and the hashing repeated until the result is below the threshold value or until the miner receives notice that another miner has succeeded. Variations in mining process will be familiar to those ordinarily skilled in the art.

A typical block contains two data structures: a block header and transactions. FIG. 1 diagrammatically illustrates an example block structure 100 from the Bitcoin protocol. The block structure 100 includes a block header 102 and a payload 104. The block header 102 in this example includes fields for a version number 106, a previous block hash value 108, a Merkle root 110, a timestamp 112, a target difficulty parameter 114, and a nonce 116. The previous block hash value 108 chains this block to the previous block in the chain, thereby resulting in the "blockchain" structure that links successive blocks together through cryptographic hashes. The Merkle root 110 refers to a Merkle tree structure based on all the transactions contained in the block. The nonce 116 is an arbitrary value that the mining node can repeated increment or decrement to change the contents of the block header 102 in order to produce different hash results when mining.

The payload 104 includes a transaction count value 118 and the list of transactions 120. The list of transactions 120 may be a list of transaction ID numbers in some implementations.

When a mining node succeeds in finding a block header that produces a hash result that is below the threshold value, then it proceeds to notify other nodes using an updated inventory message that includes the successful hash result value. The other nodes then request a copy of the new block and independently verify its validity.

Block Propagation

The blockchain ecosystem is maturing to provide increased usability through a large increase in transaction volume and, as a consequence, block sizes. As blocks become larger, in some cases exceeding 128 MB, propagating a successfully mined new block to other nodes throughout the network takes an increased time. The delay in propagation comes at a cost. First, the miners that are unaware of that a successfully-mined block has been created will continue attempting to mine their own candidate blocks in a wasted effort if the new block proves to be valid. Second, the delay in propagation and validation may result in an increased likelihood of (temporary) forks and orphan blocks.

It will be appreciated that in many blockchain protocols, the miner does not send a full copy of the block, but instead sends the hash results in an inventory message. The receiving mining nodes determines that they have not seen this alleged new block and send a GETBLOCK or GETDATA message to the successful miner. Rather than sending a full copy of the block, the successful miner send the block header, the transaction count field from the payload, and an ordered list of the transactions included in the block. The ordered list may include a set of the full transaction ID numbers (TXIDs) for the transactions. The TXIDs may, in some embodiments, be a fixed length hash of the transaction. The TXID may be a 256-bit (32-byte) number obtained by hashing the transaction using SHA-256 for instance. A receiving node may reassemble the full block by retrieving the identified transactions from the mempool by their TXIDs.

Nevertheless, as modern block sizes grow to 128 MB and beyond the size of the data to be transmitted may still be significant if the count of transactions is large. For example, a block containing half a million transactions would have an ordered list of TXIDs that is 16 MB.

Accordingly, in one aspect, the present application describes methods and systems for blockchain networks in which mining nodes provide other miners with information about their respective candidate blocks while hashing their candidate blocks. In this manner, each miner exploits the time delay between the discovery of successful blocks, which in the example of Bitcoin is about ten minutes, to provide other miners with details regarding the structure and content of candidate blocks. By providing this information in advance, when a successful block is found the successful miner need only send information from the block header and, in some cases, a coinbase transaction in order to ensure all other nodes can assemble and validate the complete new block. This data may be as little as a few hundred bytes. This increases the speed with which a successful new block is propagated through the full network.

It will be appreciated that unconfirmed transactions are propagated and validated through the network of nodes before they are confirmed by being included in a valid block. While in this unconfirmed state, the unconfirmed transactions are held in memory. This memory may be termed a "mempool". Each miner may, in some implementations, maintain its own copy of the mempool from which it can select a set of transactions for assembling a candidate block. In some alternative architectures, the mempool may be implemented as a distributed mempool across a number of nodes. In some architectures, specialized nodes may be employed by the blockchain network to manage the mempool and to provide mining nodes with transactions for inclusion in a candidate block. The present application contemplates use of the described methods and devices with any such variations in blockchain network architecture. For the purposes of simplicity of explanation, it will be assumed herein that each mining node maintains its own mempool of unconfirmed transactions.

The mining nodes use the mempool as a source of new transactions for building a candidate block. The mining nodes may further use the mempool when validating a new block from another miner as each block contains an ordered list of transactions. The ordered list may identify transactions by a unique transaction identifier, like the TXID. Accordingly, the receiving mining node retrieves the transactions from the ordered list and validates the block against block-level criteria and validates the transactions against transaction-level criteria. In this way the miners guard against double-spends and other attacks.

To illustrate an aspect of the present application, reference is now made to FIG. 2, which shows, in flowchart form, one example method 200 of blockchain mining. The method 200 is implemented by a mining node. The mining node may be implemented on a computing device, which may include one or more processing units. As will be appreciated by those skilled in the art the processing units may include specialized processing units with dedicated hardware designed to carry out the calculation operations associated with blockchain mining with significant speed and efficiency. However, it may also or alternatively include general purpose computing device. The computing device includes processor-executable software that includes processor-readable instructions that, when executed, cause the one or more processing units to carry out the operations described. The computing device includes memory and a network connection with the associated hardware and software for obtaining network connectivity and sending and receiving messages in accordance with the applicable network protocol.

The method 200 includes selecting a set of transactions from the mempool of unconfirmed transactions to build a candidate block in operation 202. The selection may be based on age of the transactions, fees payable for mining the transactions, or any other factors. The transactions form an ordered list of transactions. The mining node further determines the Merkle root based on the ordered list of transactions and forms the block header, including setting an initial value for the nonce in the header.

In operation 204, the mining node begins the repeated hashing of the block header and incrementing of the nonce as part of the search for a POW that meets the conditions of the difficulty setting. While engaged in searching for a POW with regard to its candidate block, the mining node sends information about its ordered list of transactions to other mining nodes, as indicated by operation 206. The mining node also receives messages from other mining nodes, while operation 204 is ongoing, that include information about the respective ordered lists of transactions in the candidate blocks being worked upon by those mining nodes, as indicated by operation 208. It will be appreciated that although operations 204, 206 and 208 are shown in sequence, they generally happen in parallel. The received information about respective ordered lists of transactions from other miners is stored locally by the mining node. The mining node may store the information in a table or other data structure.

The search for a POW continues until the mining node successfully finds a POW, as indicated by operation 210, or receives notice from another mining node that it has found a POW, as indicated by operation 212. If the mining node finds a POW, then in operation 214 it send some header information to other mining nodes to propagate the block details. Notably, it does not need to send the payload. It may, however, send a coinbase transaction.

If the mining node receives header info from another mining node, then in operation 216 it assembles the new block based on the stored ordered list of transactions for that mining node. If a coinbase transaction is received, then that transaction is added to the block and the mining node can construct the Merkle tree to confirm that the Merkle root is valid. The mining node then validates the new block in operation 218 and, if invalid, it may discard the new block and continue searching for its own POW. Note that there may be certain validity checks that, if failed, may prompt the mining node to take other action such as requesting additional data from the successful mining node, as will be described later. If the block is validated, it is added to the blockchain in operation 220 and propagated to further mining nodes. The mining node then returns to operation 202 to build a new candidate block and start the search anew.

It will be appreciated that the described method of pre-distributing candidate block information so that each miner knows the ordered list of transactions for each other miner, ensures only a minimum amount of information need be propagated after the POW is found. This ensures that mining nodes have the information they require to validate a new block as soon as possible, thereby reducing time wasted in search for a POW when another miner has already succeeded. Mining nodes have every incentive to propagate and validate new blocks as quickly as possible so that they can move onto searching for the next block. Potential delays due to network latency are of much less concern when pre-distributing ordered lists of transactions during the approximately ten-minute period between successive blocks.

In one example implementation, the ordered list of transactions from a candidate block may be communicate to another miner by adding ordering information to a transaction data packet. Each miner is able to identify each other miner uniquely. In one example implementation, a message may be sent that uniquely identifies the miner and the block level that the miner is working on, and that lists the TXIDs for that miner's candidate block in order.

In another example implementation, the messaging protocol may provide for appending transactions to an ordered list for a miner, removing or deleting transactions from an ordered list, replacing a transaction with another transaction, or re-ordering transactions. In the normal course, a miner is likely to use only an "add" message that specifies the ordered list of transactions. However, there are some cases in which a miner may wish to remove or replace a transaction. For example, subsequently-received information may indicate a potential double-spend with regard to one of the transactions or some other potential issue with its validity.

As another example, the miner may cycle through all increments of the nonce and may wish to reorder or otherwise adjust the transactions so as to change the Merkle root and thereby change the header to continue mining the block. The precise format the message structures may vary by implementation.

Further compression of the block propagation messages can be achieved by shortening the TXID string. The TXID in some examples is a 32 byte string. However, in some cases a compressed TXID may be used that relies on sending only a portion of the TXID. In one example, only the first eight bytes are sent.

Although the first 8 bytes of a TXID is not guaranteed to uniquely identify a transaction, the likelihood of collision in two TXIDs, both within a single message or in general is small. Given that SHA256 outputs are pseudorandom 256-bit strings, the exact likelihood of collision of two random TXID, i.e. the likelihood that any two TXIDs have the same first 4 bytes is:

$$P('TXID_1[0:8] = TXID_2[0:8]') = \frac{1}{2^{8\times 8}} = 0.0000000000000000000542$$

Where $TXID_i$ [0:n] means 'the first n bytes of $TXID_i$'. Furthermore, the likelihood that a message containing N compressed TXIDs will contain one or more collisions may be expressed as:

$$P(>0 \text{ collisions in } N \text{ TxIDs}) =$$
$$1 - P(TXID_i[0:8] \neq TXID_j[0:8] \text{ for } i, j, \in \{1, \ldots, N\} \ i \neq j) =$$
$$1 - \left(1 - \frac{1}{2^{64}}\right)^{\frac{N(N-1)}{2!}} = 1 - 0.9999999999999999999458^{\frac{N(N-1)}{2!}}$$

As an example, if a block were to contain a million transactions such that a message contained a million compressed TXIDs (N=1,000,000), then the likelihood of a collision is:

$$P(>0 \text{ collisions in } 1{,}000{,}000 \text{ TxIDs}) = 0.0000000271$$

This probability is very small and, even if a collision occurs, the message receiver may simply request the same message in uncompressed form. Alternatively, the sending mining node may first conduct a check to confirm that the ordered set of compressed TXIDs does not contain any collisions before sending and, if any are detected, send the message with uncompressed TXIDs. A flag or other signal in the message may indicate whether the TXIDs in the payload are in compressed or uncompressed format.

In accordance with the process described herein, each miner involved in the blockchain network may receive messages from each other miner specifying an ordered list of transactions contained that other miner's candidate block. To track this information, each miner may store the ordered lists in association with the respective miner identities. The miner identities may be determined by IP address or some other unique identifier. In one example implementation, each miner maintains a table or similar data structure in which each row is associated with one of the transactions in the mempool and each column is associated with a miner in the network. Order information may then be stored in the cells of the table indicating for each miner the order in which the miner has arranged the transactions in its candidate block. It will be understood that not all transactions will have an order value as not all transactions are included in every candidate block. The table below shows one simplified example of a miner ordering data table:

| TXID<br>Miner ID | A | B | C | D |
|---|---|---|---|---|
| $TX_1$ | 1 | 2 | 1 | 1 |
| $TX_2$ | 2 | 1 | 3 | 4 |
| $TX_3$ | 3 | 3 | 2 | 2 |
| $TX_4$ | 4 | 4 | 4 | 5 |
| $TX_5$ | 5 | 5 | 5 | 3 |

In this simplified example table, there four miners having miner IDs A, B, C, and D. Each miner has received and validated transactions $TX_1$, $TX_2$, $TX_3$, $TX_4$ and $TX_5$. The table can be updated to add transactions to a miner's ordered list, to replace a transaction in the order with another, or to delete a transaction from the ordered list, which may result in adjusting the ordering of the remaining transactions in that ordered list.

When a miner, such as miner A, receives a block header message from, for example miner C, indicating that a block has been found, the miner A builds the Merkle tree based on the TXIDs and the order specified for miner C. Miner A hashes the block header to verify the hash value. If the block is verified, then miner A constructs the full block with transaction data in the specified order, adds it to the blockchain, and builds a new candidate block to continue mining.

In some example implementations, the block header sent by a successful miner does not contain all fields. For example, it may contain only the nonce and the timestamp, along with the hash value obtained by miner C when hashing the full block header. The receiving miner may add the missing fields, such as the version, the prev_block hash, the Merkle root that the miner has calculated, and the difficulty setting. It can then validate the reconstructed header by hashing it can comparing it to the received hash value.

In some example implementations, the messaging from miners indicating their ordered list of transactions for their respective candidate blocks is sent automatically once a candidate block is built. In some other example implementations, the ordered list information is provided in response to a request from another miner.

In some implementations, a template identifier TmID may be defined. The template identifier is specific to a miner and to a block level, so that it effectively refers to a specific candidate block, i.e. a specific ordered list of transactions. Any messaging from a miner relating to its ordered list of transactions may include the template identifier to ensure that receiving miners associate the changes with the correct specific ordered list of transactions. In one implementation, the template identifier may be a hash of a miner identifier (miner ID) and the prev_block field in the block header, i.e. the hash of the previously block:

$$TmID = H(\text{prev block} \| \text{miner ID})$$

This ties the template identifier to a block level and specific miner.

Each message relating to ordered lists of transactions may include the template identifier, and may further include a sequence number. The sequence number may be an unsigned integer value used to indicate the order of messages from one miner relative to one another. Sequencing is helpful to a message receiver to uniquely determine the TXID ordering for a specific miner in the case that some messages are not received or are received out of order.

As mentioned above, miner ID may be a mining node's IP address or some other unique identifier for the mining node. In some embodiments, an initial authentication operation may occur when the miner attaches to the network that results in associating a unique miner ID to that mining node. The authentication operation may include a handshaking operation in which each miner provides a public key and digital signature. Authentication is connected to verification of the digital signature. In some cases, the miner ID may be based on the public key, the digital signature, or some combination thereof.

In some instances, the handshaking operation during the authentication phase may include establishment of a shared secret amongst miners. Many techniques exist for establishing a shared secret. Subsequent messaging, such as messaging relating to the ordered list of transactions, may be encrypted for confidentiality and to reduce the possibility of man in the middle attacks on the mining process.

Reference is now made to FIGS. 3A-3I, which diagrammatically illustrate example operating state and messaging flow between two miners in accordance with an implementation of the present application.

Figure 3A:
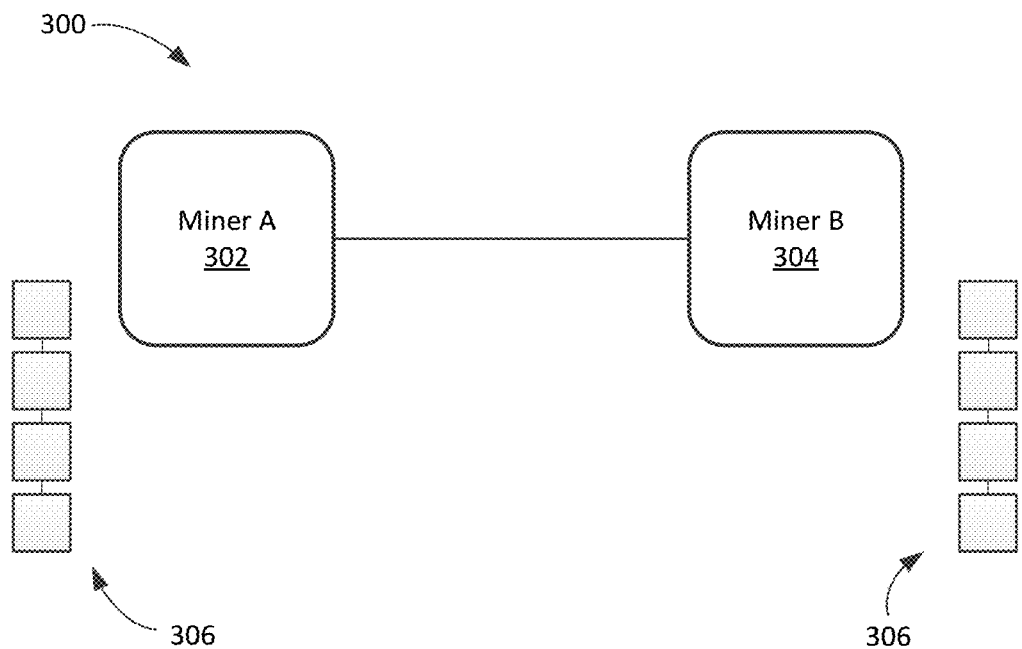
FIGS. 3A-3I illustratively show the sequence of messages and operations in an example implementation of block propagation in accordance with the present application.

In FIG. 3A, it will be seen that a first miner 302, Miner A, and a second miner 304, Miner B, are part of a blockchain network, and that there is an existing blockchain 306. The first miner 302 and the second miner 304 both have a locally-stored copy of the blockchain 306 in this example. The blockchain 306 is of a certain "height" or block level.

Figure 3B:
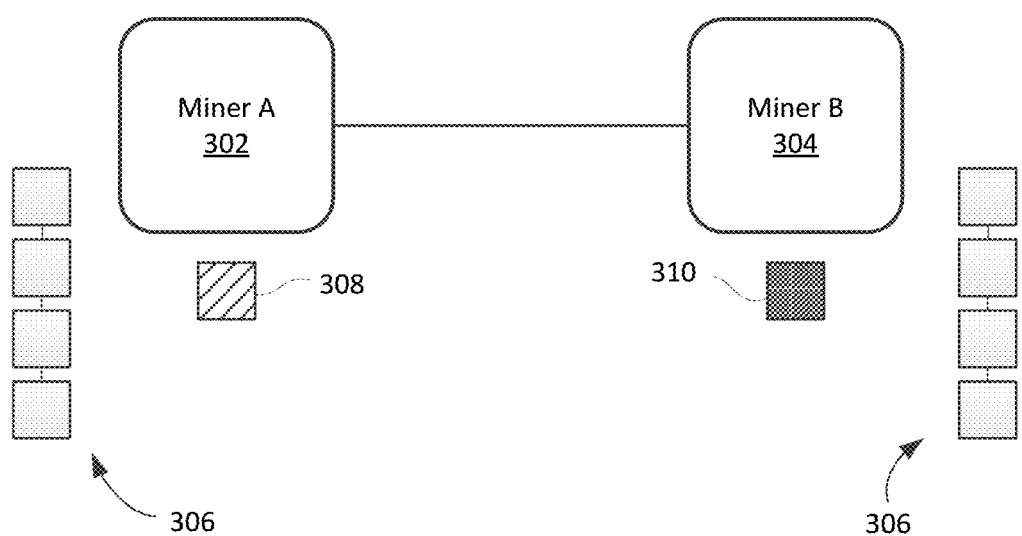

As indicated by FIG. 3B, each of the miners 302, 304 select a set of transactions from their respective mempools to build a candidate block. Specifically, the first miner 302 builds a first candidate block 308 containing a first ordered set of transactions, and the second miner 304 builds a second candidate block 310 containing a second ordered set of transactions. The first ordered set and the second ordered set may or may not contain the same transactions, and may or may not have them in the same or partially the same order, since the miners 302, 304 are free to select whichever transactions from the mempool that they wish and group them in whatever order they wish.

Figure 3C:
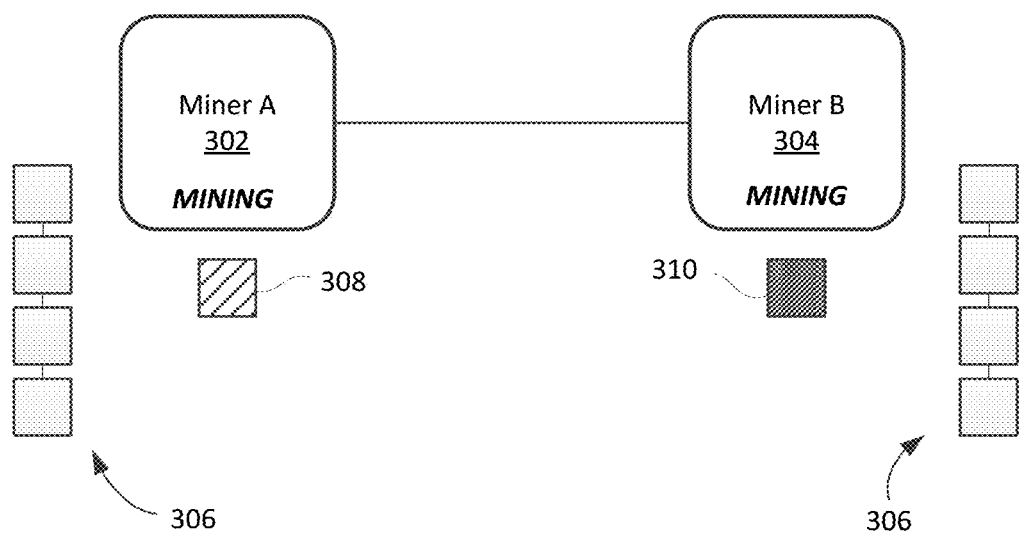

As shown in FIG. 3C, the miners 302, 304 begin mining the respective candidate blocks 308, 310 in an attempt to find a nonce that will result in a hash of the block header that is below the threshold value set by the difficultly.

Figure 3D:
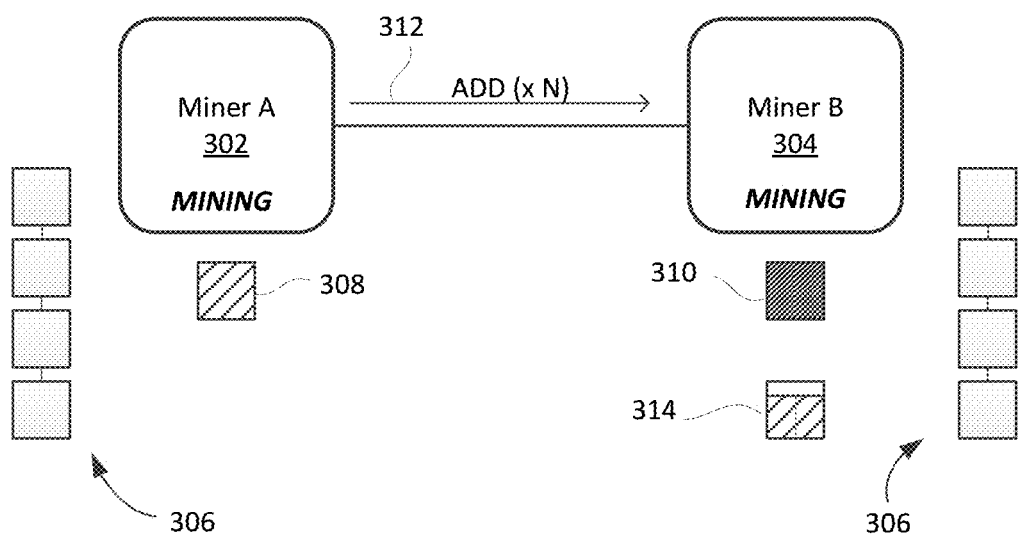

While searching for a successful proof-of-work, the miners 302, 304 exchange information about the ordered set of transactions in their respective candidate blocks 308, 310. As FIG. 3D illustrates, the first miner 302 may send an "add" message 312 to the second miner 304 providing the first ordered list of transactions from the first candidate block 308. From that information, the second miner 304 may build a template 314 of the first candidate block 308. In some example implementations, the template 314 may be the first ordered list of transactions in TXID form. In some example implementations, the template 314 may be a table, an example of which is provided above. In yet other example implementations, the template 314 may be a copy of the full candidate block, excluding certain unavailable header fields, including full transaction data.

Figure 3E:
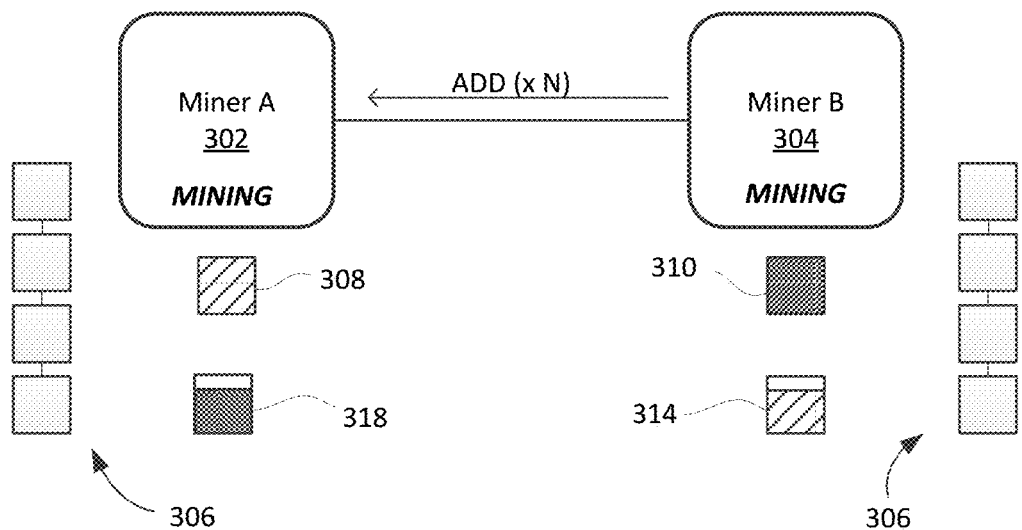

In a similar manner, the second miner 304 may send the first miner 302 an "add" message 316 containing the second ordered list of transactions from the second candidate block 310, as illustrated in FIG. 3E. From that data, the first miner 302 builds a template 318 of the second candidate block 310.

Now each miner has their own candidate block which they each continue to mine, and a template of the candidate block being worked upon by the other miner.

Figure 3F:
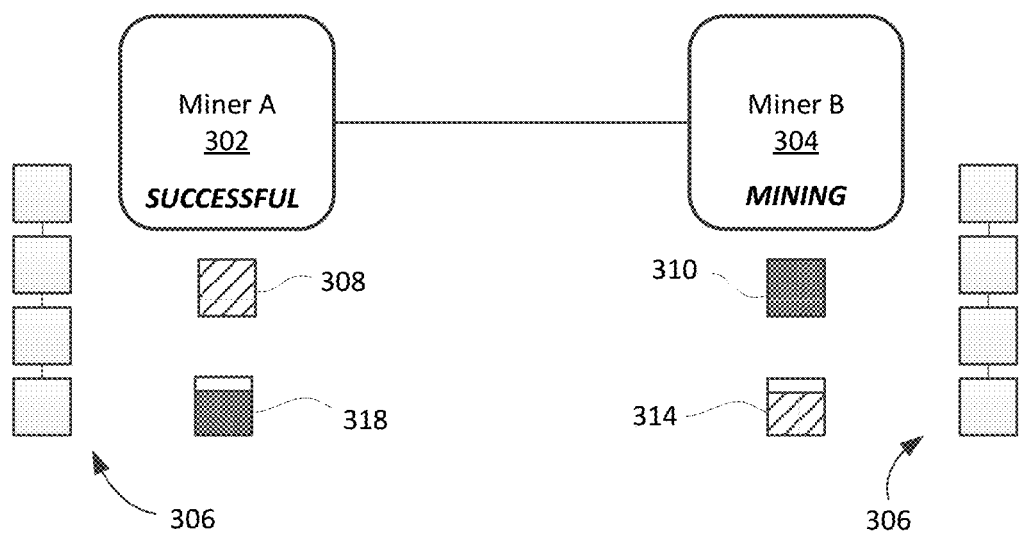
Figure 3G:
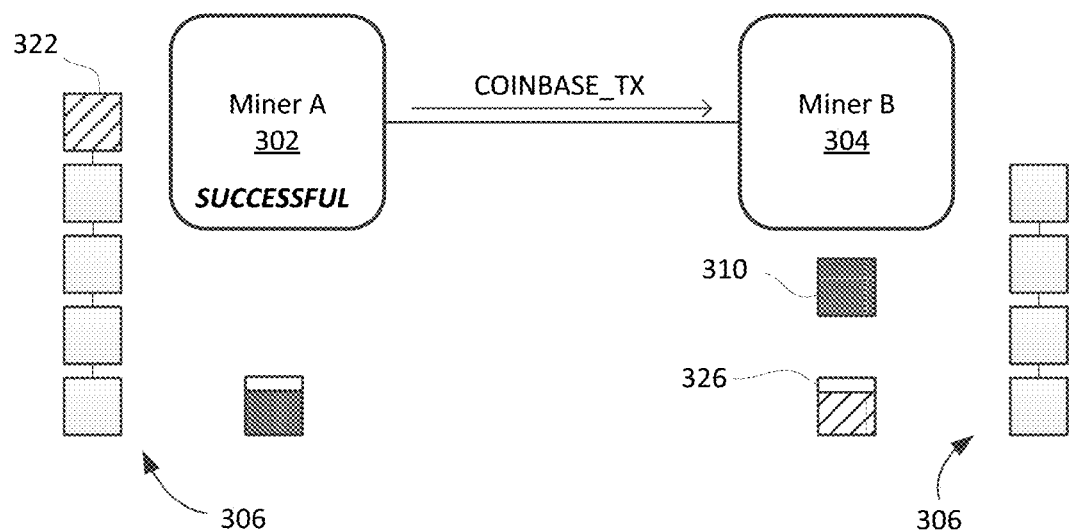
Figure 3H:
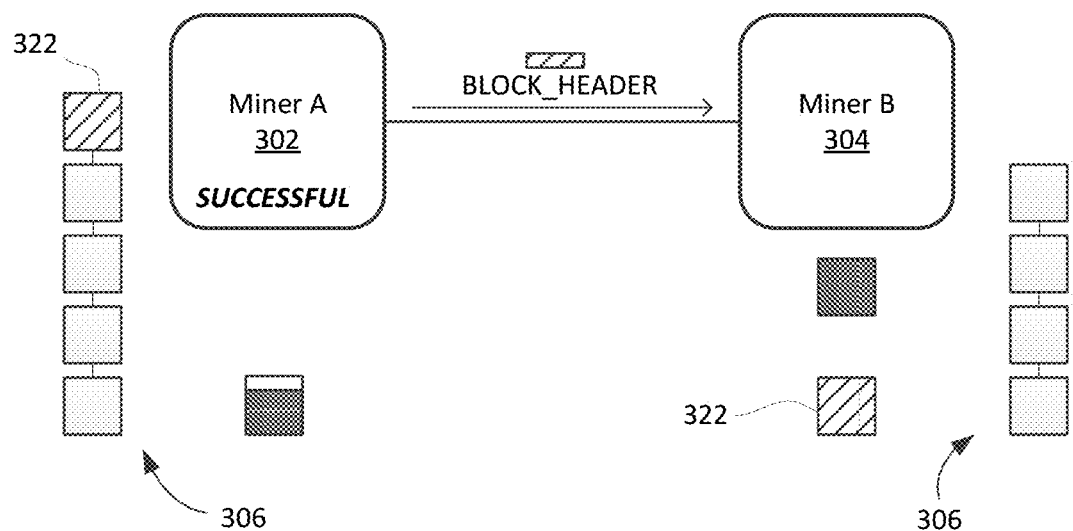

FIG. 3F shows that the first miner 302 has succeeded in finding a block header hash that meets the proof-of-work requirement. Accordingly, the first candidate block 308 with the most recently tested nonce in its header results in a valid block. FIGS. 3G and 3H then show that the first miner 302 adds the new block 322 to the blockchain 306 and transmits a message containing the coinbase transaction 320 and a message containing the block header information 324. The block header information 324 includes, at least, the nonce and a timestamp. It may or may not further include the other block header fields, such as the merkle_root field. In some cases, this may be sent as part of the block header information 324, even though it can be calculated by the second miner 304, to enable the second miner 304 to double-check its Merkle root calculation. In some cases, the first miner 302 send the second miner 304 the full block header for the new block 322. The first miner 302 may also send the second miner 304 the hash value obtained from hashing the block header so that the second miner 304 can not only verify the hash falls below the difficultly threshold but also that it matches the hash that the first miner 302 purports to have found. The hash value may be send in the coinbase transaction message 320, in the block header information message 324 or in a separate message.

Once the second miner 304 has the coinbase transaction, it can complete the transaction portion of the template 314 of the first candidate block, and can therefore calculate the Merkle root. From that calculation it can verify that the merkle_root field is accurate, if that field was included in the block header information message 324. If not, then it can complete the merkle_root field and any other missing fields, like the version, prev_block value, and bits field, in order to assemble the block header 326 for the new block 322. The other fields of the block header 326, like the nonce and timestamp, are provided by the block header information message 324. The second miner 304 may then validate the new block by hashing the assembled block header 326.

Figure 3I:
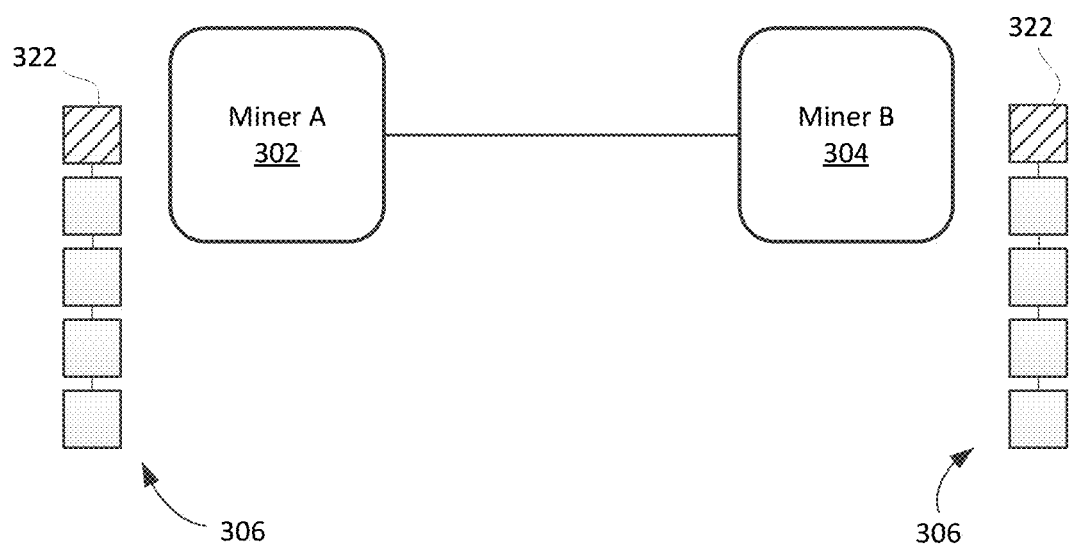

Assuming that the assembled block at the second miner 304 is validated, the second miner 304 then add that new block 322 to its copy of the blockchain 306, as shown in FIG. 3I.

Although the above-described sequence shows the coinbase transaction message 320 being sent prior to the block header information message 324, it will be understood that in some implementation the block header information message 324 may be sent first, or that both messages may be combined into a single message. Other variations in the order of operations or implementation details of a specific instance may be made without altering the overall functional operation of the described system and method.

It may be appreciated by those skilled in the art of blockchain networks that in some cases a block may be mined earlier than anticipated. In Bitcoin, for example, the difficulty setting provides for discovery of a valid block approximately every ten minutes, but the timing is not certain. It is possible that a valid block may be found much earlier. Moreover, some messages propagating transactions or transaction ordering information may encounter network delays in propagating through the network.

Accordingly, the possibility exists, albeit unlikely, that a valid block is found by a miner and the header information is sent to other miners, but at least one of those miner does not have all the transactions included in the block or has an incomplete or incorrect ordered list of transactions for the successful miner. When that miner attempts to validate the Merkle root field of the new block header, a mismatch will be found and the block considered invalid. One option is that the miner considers the block invalid and discards it. However, in another embodiment, the miner may send a request message to the successful miner for the set of Merkle leaves, i.e. the ordered list of TXIDs. Upon receiving the sent of leaves, the miner may then determine where the error in Merkle root calculation arose. If the cause is incorrect or incomplete ordering of transactions, the miner may update the ordering and verify the new block. If the cause is a missing transaction, the miner may request the new transaction and continue the verification process. Note that in some embodiments, a missing transaction may be detected prior to successful discovery of the block if a miner that receives an ordered list of transactions for another miner's candidate block finds that it does not have one of the TXIDs in its mempool. In that case, the receiving miner can request a copy of that transaction and update its mempool.

Is some implementations, one or more miners may wish to maintain some confidentiality over its transaction selection and ordering. In such implementations, it may be possible for a miner to encrypt its ordered list of transactions when distributing it during the mining phase. If a valid block is found, then the miner distributes a decryption key together with the header information and/or the coinbase transaction, then permitting the receiving miners to decrypt the ordered list of transactions and validate the new block.

The following table describes one set of example messages for one illustrative implementation of the messaging for propagation of ordered transaction lists amongst miners:

| Value | Field Size (Bytes) | Data type | Name | Description |
|---|---|---|---|---|
| 0 | 32 + 4 | char[32] + varInt | get_chunk | Request for chunk of TXIDs The first 32 bytes is a template ID and the 4 bytes is a sequence number. |
| 1 | 32 + 4 + 4 + 32 * N | char[32] + varInt + varInt + char[32] | add | Add a list of TXIDs (chunk) to the message sender's candidate block. The first 32 bytes is the template ID, the second 4 bytes is the sequence number. The third 4 bytes is the length of the rest of the message containing the N TXIDs chunk payload. |
| 2 | 32 + 4 + 4 + 4 * N | char[32] + varInt + varInt + char[32] | cadd | Add a list of transaction hashes (chunk) to the message sender's candidate block. The first 32 bytes is the template ID, the second 4 bytes is the |

-continued

| Value | Field Size (Bytes) | Data type | Name | Description |
|---|---|---|---|---|
| 3 | 32 + 4 + 4 + 32 | char[32] + varInt + varInt + char[32] | replace | sequence number. The third 4 bytes is the length of the rest of the message containing the N compressed TXIDs chunk payload. Replace a transaction hash in the list of message sender's transactions. The first 32 bytes is the template ID, the next 4 bytes is the sequence number. The next 4 bytes indicates the position of the tx hash within the chunk. The last 32 bytes is the replacement tx hash |
| 4 | 4 + 4 + 4 | char[32] + varInt + varInt | creplace | Replace (compressed) transaction hash in the message sender's candidate block. The first 4 bytes is the tx hash and the last 4 bytes is the sequence number indicating the position of the tx in the message sender's block. |
| 5 | 4 + 4 | varInt + varInt | delete | Delete the tx hash in the position indicated by the 4-byte int |
| 6 | 80 | char[32] | block_header | Block header data packet. This notifies a peer of a new block header. The block header fields are converted to string variables and concatenated into a single 80-byte string. This message is sent in conjunction with a valid coinbase_tx message. |
| 7 | 111-120 | char[32] | coinbase_tx | Message containing the (raw) coinbase tx for a successful miner. This message is sent in conjunction with a block_header message. |

A receiving miner modifies the candidate block template corresponding to the template identifier in the message. Messages received out of sequence, according to sequence number, for a particular template identifier may be queued until intervening messages are received.

In all likelihood, the receiving miner has the applicable transactions corresponding to the TXIDs in its mempool, but if a transaction is missing, then it can request a copy of any missing transactions.

It will be appreciated that the above-described illustrative messaging protocol is one example implementation.

Short Transaction Identifier Collision and Reconciliation

As noted above, block propagation is one situation in which it may be advantageous to save bandwidth and improve propagation speed by using a compressed transaction identifier, i.e. a short TXID. The short TXID may be a truncated TXID, as described above, where the short TXID is a portion of the full TXID. The example given above proposed using the first 4 bytes (32 bits) of the 256-bit full TXID. Other length short TXIDs may be used in other implementations.

More generally, a short TXID may be any mapping of a full TXID to a shorter length identifier. The mapping function deterministically maps the full TXID to its corresponding short TXID; however there is a non-zero probability of two different full TXIDs mapping to the same short TXID. In the examples used herein, the mapping proposed is the use of a portion of the full TXID, e.g. a truncated TXID, in part because it is trivially straightforward to identify the full TXID (or TXIDs) in a mempool that match the short TXID.

The use of short TXIDs may be useful in the case of block propagation, whether for candidate blocks prior to finding a POW or for mined blocks after finding a POW. Short TXIDs may also be useful in other contexts when sending a large set of transaction identifiers.

It will be appreciated that the use of short TXIDs saves bandwidth and speeds block propagation, but comes with a risk of collision. That is, there is some non-zero probability that a short TXID maps to more than one full TXID. The fewer bits used in the short TXID, the higher the probability of a collision. The chance of a collision in a single block may be given as:

$$P_c = 1 - \left(1 - \frac{1}{2^n}\right)^t$$

In the expression above, $P_c$ is the probability of a collision, n is the number of bits used for the short TXID, and t is the number of transactions in the block. Assuming an average transaction size of 400 bytes, a collision may be expected to occur in $1/P_c$ blocks. As examples, consider the case of a 1 GB block or a 1 TB block:

| n bits | 1 GB (2.5M txs) | 1 TB (2.5B txs) |
|---|---|---|
| 32 bits | 1718 | 2.26 |
| 40 bits | 438,805 | 440 |
| 48 bits | 112,589,991 | 112,590 |

-continued

| n bits  | 1 GB (2.5M txs) | 1 TB (2.5B txs) |
|---------|-----------------|-----------------|
| 56 bits | 28,823,037,615  | 28,823,038      |
| 64 bits | 7,378,697,629,484 | 7,378,697,629 |

It will be appreciated that collisions may be expected fairly infrequently, even in the case of a 32 bit short TXID and a 1 GB block.

There are three potential scenarios in which a collision may occur. First, the sending node may identify the collision. For example, in calculating the short TXIDs the sending node may identify that two of the short TXIDs match. As another example, the sending node may search its mempool for each short TXID to see whether it matches to more than one full TXID in the mempool.

Second, the receiving node may identify the collision. For example, the receiving node may have a transaction in its mempool that was not in the sending node's mempool, due to propagation timing delays with respect to the transaction or with respect to the block data. In such a case, when attempting to locate the corresponding full TXIDs in its mempool, the receiving node will determine that the short TXID matches to more than one full TXID.

Third, the collision may result from the sending node's mempool having a full TXID that maps to a short TXID where the full TXID is not in the receiving node's mempool (normally a situation in which the receiving node requests the missing transaction), but the receiving node's mempool has a different full TXID that happens to map to the same short TXID. This third situation would not be identified by either node when mapping short TXIDs to full TXIDs. Instead, it will be found by the sending node when it attempts to validate the block data and finds that the Merkle root calculated for the block of transactions does not match the Merkle root provided by the sending node. It will not, however, be able to determine from that information which transaction was incorrectly mapped due to a collision.

The present application provides methods to resolve all three collision scenarios.

Figure 4:
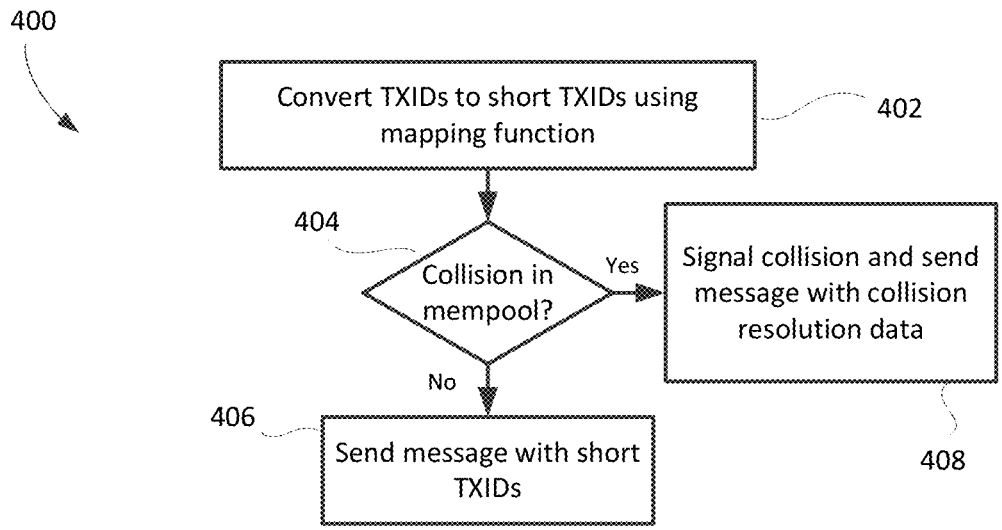
FIG. 4 shows, in flowchart form, one example method of resolving a short transaction identifier collision.

Reference is made to FIG. 4, which shows, in flowchart form, one example method 400 of resolving a short transaction identifier collision at a sending node. In some example implementations, the operations described in the method 400 are carried out by one or more processors as a result of processor-executable instructions executed by the one or more processors. The instructions may be embodied in a software application or module, in some cases, stored in memory accessible to the one or more processors.

The method 400 may be implemented in the context of block propagation. The block may include a header and an ordered list of transaction identifiers, i.e. TXIDs.

The method 400 includes, in operation 402 converting the TXIDs to short TXIDs using the applicable mapping function. In this example, the mapping function may include truncating the full TXIDs. In some implementations, the full TXID may be 256 bits and may result from hashing the transaction contents with a suitable hash function, such as SHA-256. The full TXID may be truncated by retaining only the first N bits of the TXID, where N is a suitable proportion of the full 256 bits to result in bandwidth savings without excessive risk of collisions. In some cases, N is 32 bits.

In operation 404, the sending node determines whether the short TXIDs result in a collision. It may do so by, for each short TXID, searching the mempool of full TXIDs to ensure that only one full TXID has a first 32 bits that match the short TXID. If no collision results, then the sending node sends a message containing the short TXIDs in an ordered list. The message may be a block propagation message.

If a collision is detected in operation 404, then in operation 408 the sending node signals the collision and sends a message with collision resolution data. In one example, the message with collision resolution data may be supplemental to the block propagation message. In another example, the message with collision resolution data may be a modification to the block propagation message. The collision resolution data may include identifying the transaction within the ordered list that resulted in the collision and providing full TXID information for that transaction. The full TXID information may include inserting the full TXID in a suitable field in the message. The full TXID information may include inserting the remainder of the TXID in a suitable field such that when combined with the short TXID it results in the full TXID. The full TXID information may include sending a short additional portion of the TXID sufficient to resolve the collision without sending the entire TXID. The fact that a collision occurred may be signaled in the block propagation message. For example, the message may include dedicated flag to signal a collision has occurred and, if the flag is set, an index to the short TXID that resulted in a collision and a field containing the collision resolution data.

Figure 5:
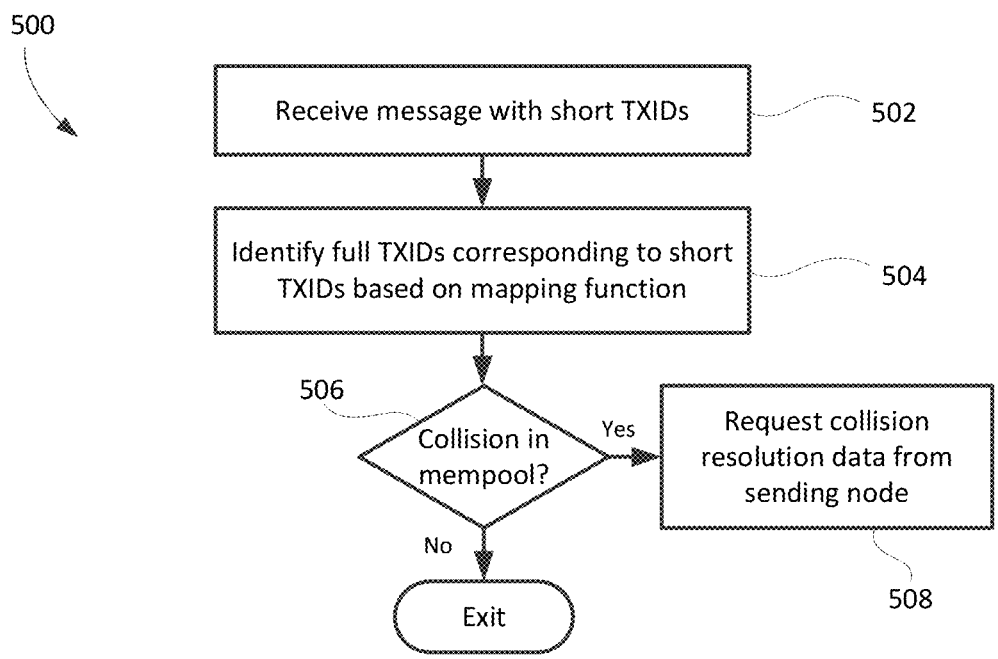
FIG. 5 shows, in flowchart form, another example method of resolving a short transaction identifier collision.

Reference is now made to FIG. 5, which shows, in flowchart form, an example method 500 for resolving a short transaction identifier collision at a receiving node. In some example implementations, the operations described in the method 500 are carried out by one or more processors as a result of processor-executable instructions executed by the one or more processors. The instructions may be embodied in a software application or module, in some cases, stored in memory accessible to the one or more processors.

The method 500 includes receiving a message containing short TXIDs in operation 502. The message may be a block propagation message, in some embodiments. In operation 504, the receiving node converts the short TXIDs to full TXIDs based on the mapping function. In this example, in which the short TXID is a truncation of a full TXID, the receiving node searches its mempool to find a full TXID having a first four bytes that match the short TXID.

In operations 506 and 508, the receiving node determines whether any of the short TXIDs resulted in a collision, i.e. whether one of the short TXIDs mapped to more than one of the full TXIDs in the mempool. If so, then the receiving node requests collision resolution data from the sending node. In particular, the receiving node may send the sending node a collision message identifying the short TXID that resulted in a collision. In response, the sending node may provide collision resolution data in a message, such as the full TXID, the remainder of the full TXID, or a sufficient portion of the full TXID to resolve the collision.

Figure 6:
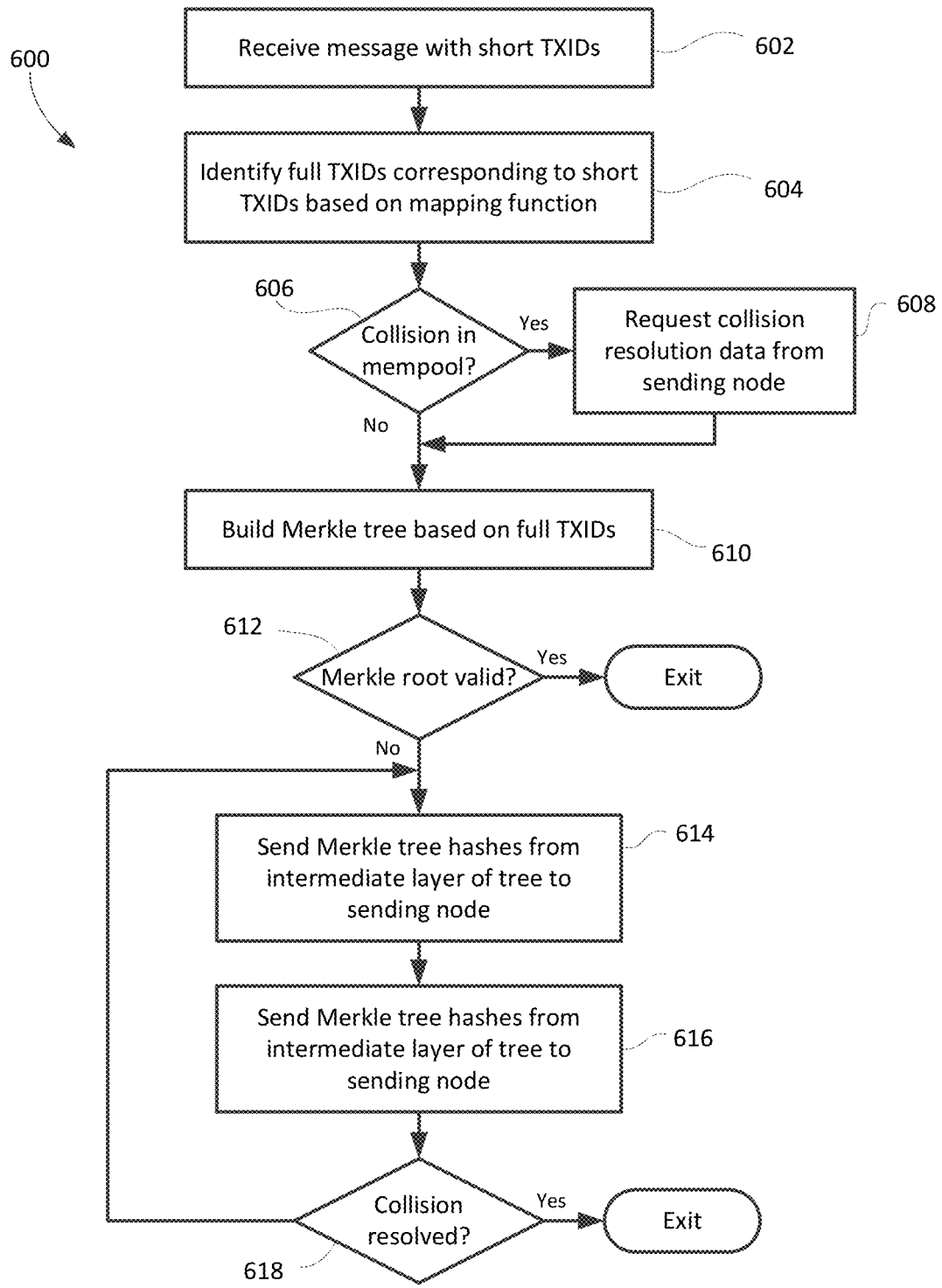
FIG. 6 shows, in flowchart form, a further example method of resolving a short transaction identifier collision.

Reference will now be made to FIG. 6, which shows an example method 600 for resolving a short transaction identifier collision in accordance with the third scenario. In this scenario, the collision is not detected by either the sending node or the receiving node because the two full TXIDs that collide are in respective different mempools. The collision may be inferred from the fact the Merkle tree root calculated by the receiving node does not match the Merkle tree root provided by the sending node in the block propagation message. To identify the collision, the receiving node and sending node may leverage the Merkle tree structure to pinpoint the transaction involved in the collision.

In some example implementations, the operations described in the method 600 are carried out by one or more processors at the receiving node as a result of processor-executable instructions executed by the one or more processors. The instructions may be embodied in a software application or module, in some cases, stored in memory accessible to the one or more processors.

The method 600 includes receiving a message containing short TXIDs in operation 602. The message may be a block propagation message, in some embodiments. Operation 602 further includes receiving block header information, such as the Merkle tree root for the ordered list of transactions. In operation 604, the receiving node converts the short TXIDs to full TXIDs based on the mapping function. In this example, in which the short TXID is a truncation of a full TXID, the receiving node searches its mempool to find a full TXID having a first four bytes that match the short TXID.

In operations 606 and 608, the receiving node determines whether any of the short TXIDs resulted in a collision, i.e. whether one of the short TXIDs mapped to more than one of the full TXIDs in the mempool. If so, then the receiving node requests collision resolution data from the sending node. In particular, the receiving node may send the sending node a collision message identifying the short TXID that resulted in a collision. In response, the sending node may provide collision resolution data in a message, such as the full TXID, the remainder of the full TXID, or a sufficient portion of the full TXID to resolve the collision.

Having identified no collisions, or having resolved any identified collision, in operation 610 the receiving node builds a Merkle tree corresponding to the ordered list of transactions based on the full TXIDs identified in operation 604. In operation 612, the receiving node assesses whether the calculated Merkle tree root matches the Merkle tree root provided by the sending node. If so, then the receiving node has validated the contents of the block and may continue with its validation of the block and/or propagation of the block to a next node or, in the case of candidate block propagation, it may simply store the candidate block in memory as described above.

If the calculated Merkle root does not match the one provided by the sending node, then the mis-match may result from a collision. To resolve the collision, the sending node and the receiving node may narrow down the likely transaction by exchanging intermediate layer Merkle tree hash data. To explain, reference will also now be made to FIG. 7, which illustrates a simple example of a Merkle tree 700.

A Merkle tree is constructed by a recursive concatenating and hashing the contents of child nodes to build up to a root node. Each concatenation of two child nodes and hash provides the content of the parent node in the layer above. In the case of the Merkle tree 700, for example, the leaf nodes indicated as $T_i$ are each TXIDs. TXIDs are themselves hashes of transaction data. Taking as an example, $T_3$ and $T_4$, they are concatenated and hashed to find the contents of the node above, $N_{32}=H(T_3\|T_4)$. If the leaf nodes are at layer 4 of the Merkle tree 700, then node N32 is at layer 3 of the Merkle tree 700. Node $N_{21}$ is determined as a hash of the concatenated child nodes below: $N_{21}=H(N_{31}\|N_{32})$. In a recursive, breadth-first, bottom-up fashion, the concatenation and hashing continues so as to build the nodes of the Merkle tree 700 until a root node 702 is found. The root node 702 is at layer 0 of the Merkle tree 700.

Figure 7:
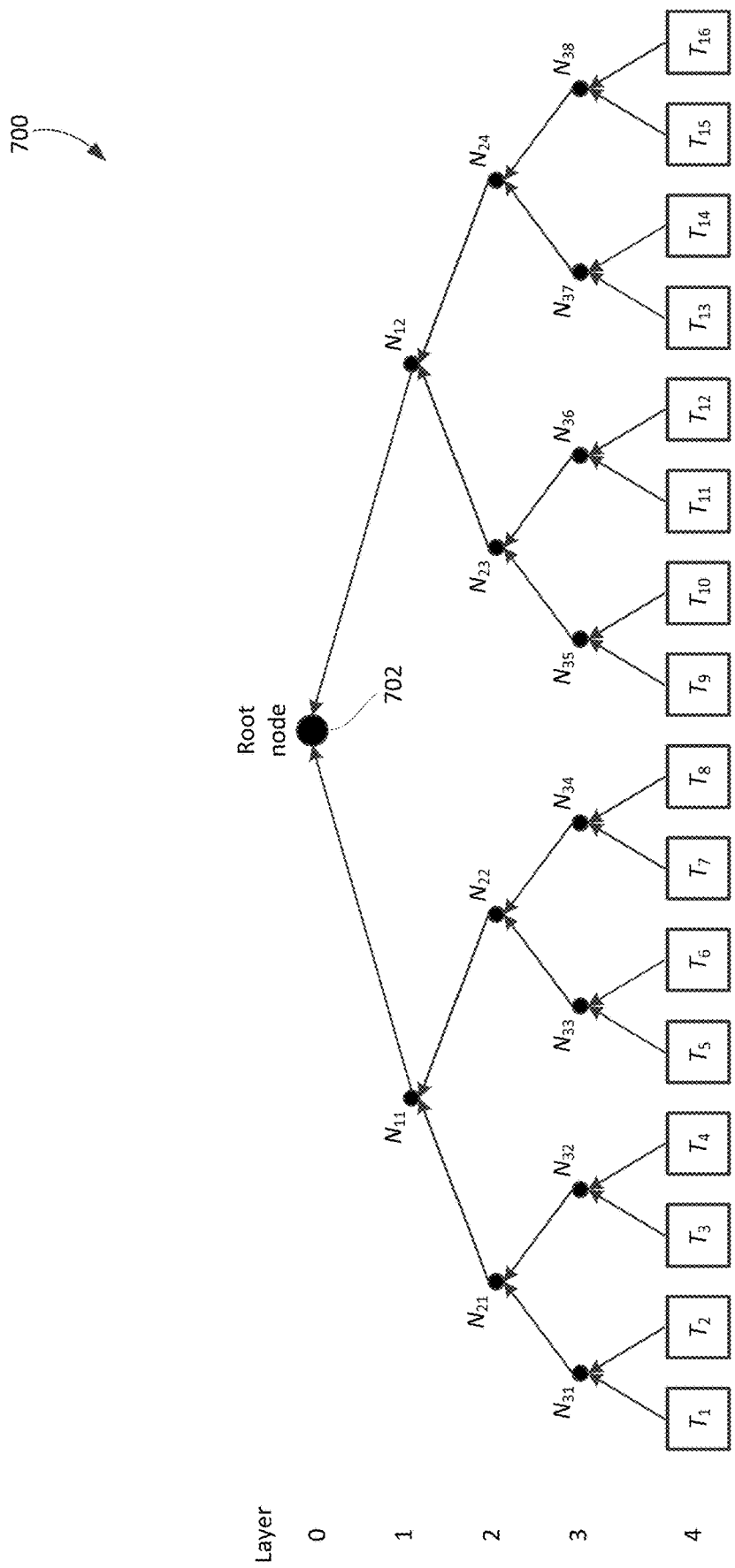
FIG. 7 shows a simplified example of a Merkle tree structure.
Figure 8:
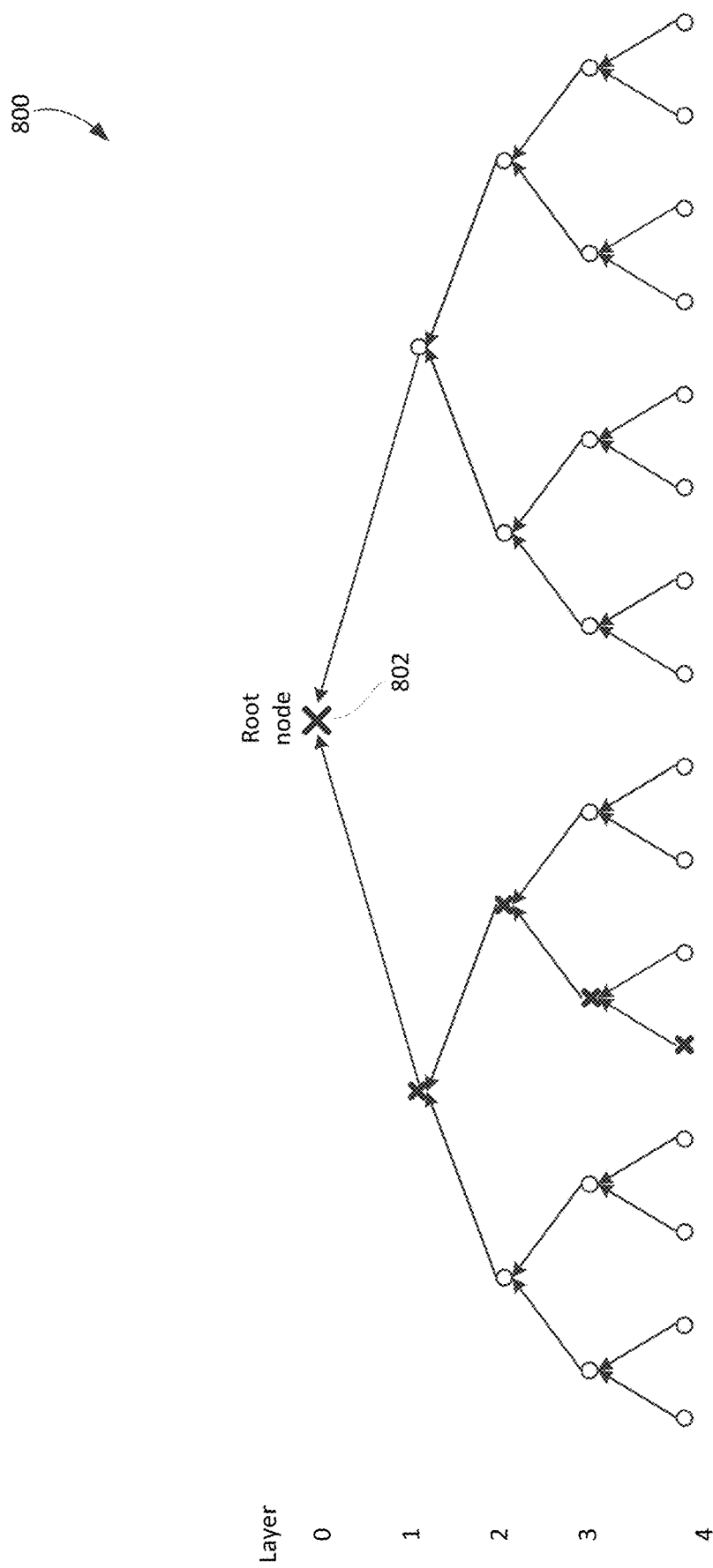
FIG. 8 shows a simplified example of a Merkle tree structure with an erroneous TXID.
Figure 9:
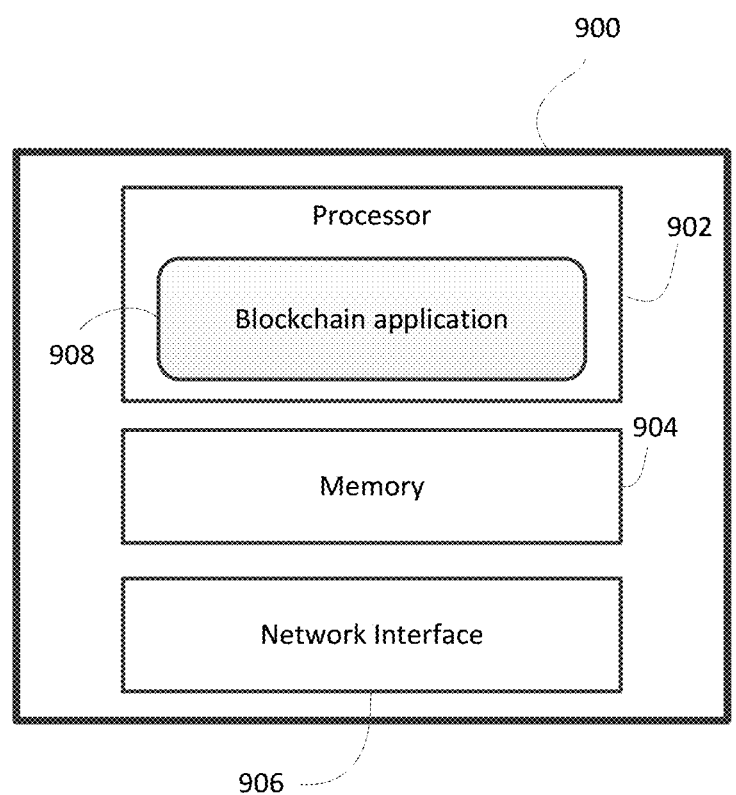
FIG. 9 shows, in block diagram form, a simplified example of a blockchain node.

It will be appreciated that any change to a leaf node, such as an incorrect TXID, will impact all related nodes in a path up the Merkle tree 700 to the root node 702. Reference is now also made to FIG. 8, which illustrates a Merkle tree 800 having the same structure as the Merkle tree 700 (FIG. 7). The Merkle tree 800 has a root node 802 and five layers labeled from 0 to 4. The leaf nodes at layer 4 include one erroneous TXID 804, as indicated by the 'x' symbol. The nodes marked with a 'o' have the correct TXID and/or correct Merkle tree hash. It will be noted that the erroneous TXID 804 results in incorrect Merkle tree hashes marked by the 'x' symbol in a path up to the Merkle tree root node 802, which is also incorrect. The hashes are "incorrect" in the sense that they do not match the expected hashes that would result from having the correct TXID instead of the erroneous TXID 804.

Returning now to FIG. 6, if the calculated Merkle root does not match the Merkle root provided by the sending node, then in operation 614 the receiving node sends Merkle tree hashes from an intermediate layer of the calculated Merkle tree. The message may be structured to indicate the Merkle tree layer and to contain an ordered list of the Merkle tree hashes. For example, with reference still to FIG. 8, the receiving node may send a data structure signaling layer 2 and providing the four Merkle tree hashes from the nodes of layer 2.

The sending node receives the provided intermediate layer Merkle tree hashes and compares them to the Merkle tree hashes from its own calculation of the Merkle tree. The sending node then transmits data to the receiving node identifying which of the Merkle tree hashes is incorrect. For example, it may send an index value pointing to the incorrect hash. In this example, with four hashes, the sending node may transmit a two-bit value indicating which hash is incorrect. In some cases, it may send a binary signal indicating whether each hash is correct or incorrect. In this example, such a signal may be 0,1,0,0, for instance. This may permit the sending node to signal if there is more than one incorrect hash.

Accordingly, in operation 616, the receiving node receives a message from the sending node indicating which of the Merkle tree hashes is incorrect. The receiving node may then narrow down its search to the sub-tree beneath the incorrect Merkle tree hash. Accordingly, if the collision is not yet resolved, as indicated by operation 618, then the receiving node may send a further message to the sending node in operation 614 with Merkle tree hashes from further down within the subtree. For example, it may signal that it is sending the four Merkle tree hashes (in this case, TXIDs) from layer 4 within the subtree. In some implementations, the receiving node signals which subtree, such as by including in its message data identifying that the subtree root is at layer 2, index 1. In some other implementations, the sending node may infer that the subsequent message relates to the subtree at layer 2, index 1, since that was the subtree identified by the sending node as incorrect.

In this example, having send the four TXIDs from the subtree to the sending node, the receiving node then receives a message indicating which of the TXIDs is incorrect and providing collision resolution data. The collision resolution data may include the full correct TXID, for example. The sending node may alternatively send the full transaction.

It will be appreciated that the above example is a simplified illustration using a particularly small Merkle tree. For a larger tree, the receiving node and/or sending node may trade off the quantity of hashes transmitted with the number of round-trip communications. Consider that in the case of a terabyte block containing about 2.5 billion transactions the Merkle tree will have 32 layers. Each layer is twice as large as its parent. The size of a layer is given by $2^n \times 32$ bytes. However, because only the portion of an intermediate layer within a subtree is being sent, then each message only contains $2^k$ elements, where k is the depth within the subtree.

In the case of a 32 layer tree, to resolve the collision in three round trips of messaging, the receiving node would need to traverse 11 layers deep each time, which involves sending about 64 kB of Merkle tree hash data each round trip. In order to reduce this to two round trips, the receiving node would traverse 16 layers deep and would send about 2 MB per message.

It will be appreciated that the above operations could be carried out by having the sending node send the correct Merkle tree hashes from an intermediate layer, and having the receiving node replying by indicating which of them does not match the calculated Merkle tree hashes.

In one variation, a probabilistic approach may be used to further reduce the quantity of data transmission. Instead of sending the entire 32 byte hash value for each Merkle tree hash, the nodes could send only 8 bytes, i.e. 25% of the hash value. The probability of a false positive in such a case is 1 in 18,446,744,073,709,551,616. The consequence of this unlikely event is that the search does not result in finding the colliding transaction. In such as case, the search protocol may be restarted using 16 bytes or using the full 32 bytes. The likelihood of a false positive is sufficiently low that in some cases only 4 bytes of the Merkle tree hash may be used.

In yet another variation, the sending node may pre-emptively send some higher layer portion of the Merkle tree. For example, the sending node may include partial Merkle tree hashes (e.g. 4 bytes) for an intermediate layer, such as layer 10, when sending the block propagation message. The cost of such a transmission is 4 kB. A single round trip resolution of a collision (in the case of a 1 GB block) would then only require subtrees 12 layers deep at a cost of 16 kB.

Pre-emptive sending of Merkle tree intermediate layer hash data may be particularly useful in the case of expected attack scenarios. Moreover, if the receiving node has advance information regarding the intermediate layer it can alter its request approach depending on the number of collisions it identifies.

The messages sent between the receiving node and the sending node may have a prescribed structure. As an example, a message from a receiving node to the sending node providing notice of a mismatched Merkle root and providing intermediate layer Merkle hash data may take the form:

```
[   block_hash: byte[32],
    subtree_root_layer: int,
    subtree_root_index: int,
    data_layer: int,
    [hash0, hash1, ... hashn] : byte[ ][32]
]
```

In the above example data structure, the message references the block_hash as an identifier of the block, and provides an index to the layer of the Merkle tree using subtree_root_layer. If the message is signalling a sub-tree and a depth within the sub-tree, then the quantities subtree_root_layer and data_layer are coded. The layer of the actual data is not strictly necessary as it can be calculated by log 2(nElements); however for illustrative purposes it is included here. The n+1 Merkle tree hashes are then included.

The response message may be an array of indexes of hashes that do not match. If the layer of data is the bottom layer, e.g. leaf nodes, of the Merkle tree, then it may include TXIDs or raw transaction data matching the indexes of incorrect hashes. In one example, such a response message may take the form:

```
[
    block_hash: byte[32],
    has_txs: bool, //flag to indicate bottom of the tree and are including txs
    subtree_root_layer: int,
    subtree_root_index: int,
    data_layer: int,
    [1]: int[ ],[rawtx1]: byte[ ][ ]
]
```

Suitable modifications may be made to the data structures to accommodate the unlikely possibility of more than one such collision in a block.

It will be appreciated that it may be that some or all of the above-described operations of the various above-described example methods may be performed in orders other than those illustrated and/or may be performed concurrently without varying the overall operation of those methods.

Reference is now made to FIG. 4, which shows, in block diagram form, a simplified mining node 400, in accordance with an example of the present application. The mining node 400 includes a processor 402, which may include one or more microprocessors, application specific integrated circuits (ASICs), microcontrollers, or similar computer processing devices. The mining node 400 may further include memory 404, which may include persistent and non-persistent memory, to store values, variables, and in some instances processor-executable program instructions, and a network interface 606.

The mining node 800 may include a processor-executable blockchain application 408 containing processor-executable instructions that, when executed, cause the processor 402 to carry out one or more of the functions or operations described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer-implemented method of resolving short transaction identifier collision in a blockchain network, comprising:
   determining a set of short transaction identifiers corresponding to full transaction identifiers stored in a mempool and confirming that none of the short transaction identifiers in the set result in a collision within the mempool;
   sending block data to a receiving node, including a block Merkle root and the set of short transaction identifiers;
   receiving, from the receiving node, Merkle tree hashes from an intermediate layer of a Merkle tree;

comparing the received Merkle tree hashes with locally-generated Merkle tree hashes for the intermediate layer of the Merkle tree to identify which of the received Merkle tree hashes is incorrect; and sending resolution data to the receiving node identifying which of the received Merkle tree hashes is incorrect and providing one or more full transaction identifiers to enable correction of the incorrect Merkle tree hash.

2. The method of claim 1, wherein each short transaction identifier is a truncation of its corresponding full transaction identifier.

3. The method of claim 1, wherein the resolution data includes a flag for each of the received Merkle tree hashes for the intermediate layer indicating whether that Merkle tree hash is valid.

4. The method of claim 1, wherein the resolution data includes full transaction identifiers for a portion of a bottom layer of the Merkle tree.

5. The method of claim 1, wherein the received Merkle tree hashes include partial Merkle tree hashes.

6. The method of claim 1, wherein the receiving Merkle tree hashes and the sending resolution data are repeated for further layers of the Merkle tree until the receiving node has correct full transaction identifiers for calculating the block Merkle root for a block.

7. The method of claim 1, wherein the sending resolution data includes:
sending data identifying which of the received Merkle tree hashes is incorrect;
receiving further Merkle tree hashes from the receiving node from a layer lower in the Merkle tree than the intermediate layer;
identifying one of the further Merkle tree hashes not matching a corresponding locally-generated Merkle tree hash; and
sending the one or more full transaction identifiers used in generating the corresponding locally-generated Merkle tree hash.

8. A computing device to resolve short transaction identifier collision in a blockchain network, the computing device including:
one or more processors;
memory; and
computer-executable instructions stored in the memory that, when executed by the one or more processors, cause the one or more processors to:
determine a set of short transaction identifiers corresponding to full transaction identifiers stored in a mempool and confirm that none of the short transaction identifiers in the set result in a collision within the mempool;
send block data to a receiving node, including a block Merkle root and the set of short transaction identifiers;
receive, from the receiving node, Merkle tree hashes from an intermediate layer of a Merkle tree;
compare the received Merkle tree hashes with locally-generated Merkle tree hashes for the intermediate layer of the Merkle tree to identify which of the received Merkle tree hashes is incorrect; and
send resolution data to the receiving node identifying which of the received Merkle tree hashes is incorrect and providing one or more full transaction identifiers to enable correction of the incorrect Merkle tree hash.

9. The computing device of claim 8, wherein each short transaction identifier is a truncation of its corresponding full transaction identifier.

10. The computing device of claim 8, wherein the resolution data includes a flag for each of the Merkle tree hashes for the intermediate layer indicating whether that Merkle tree hash is valid.

11. The computing device of claim 8, wherein the resolution data includes full transaction identifiers for a portion of a bottom layer of the Merkle tree.

12. The computing device of claim 8, wherein the received Merkle tree hashes include partial Merkle tree hashes.

13. The computing device of claim 8, wherein the instructions, when executed, are to cause the one or more processors to repeat the receiving Merkle tree hashes and the sending resolution data for further layers of the Merkle tree until the receiving node has correct full transaction identifiers for calculating the block Merkle root for a block.

14. The computing device of claim 8, wherein the instructions, when executed, are to cause the one or more processors to the send resolution data by at least:
sending data identifying which of the received Merkle tree hashes is incorrect;
receiving further Merkle tree hashes from the receiving node from a layer lower in the Merkle tree than the intermediate layer;
identifying one of the further Merkle tree hashes not matching a corresponding locally-generated Merkle tree hash; and
sending the one or more full transaction identifiers used in generating the corresponding locally-generated Merkle tree hash.

15. A non-transitory computer-readable medium storing processor-executable instructions to resolve short transaction identifier collision in a blockchain network, wherein the processor-executable instructions, when executed by one or more processors, are to cause the one or more processors to:
determine a set of short transaction identifiers corresponding to full transaction identifiers stored in a mempool and confirm that none of the short transaction identifiers in the set result in a collision within the mempool;
send block data to a receiving node, including a block Merkle root and the set of short transaction identifiers;
receive, from the receiving node, Merkle tree hashes from an intermediate layer of a Merkle tree;
compare the received Merkle tree hashes with locally-generated Merkle tree hashes for the intermediate layer of the Merkle tree to identify which of the received Merkle tree hashes is incorrect; and
send resolution data to the receiving node identifying which of the received Merkle tree hashes is incorrect and providing one or more full transaction identifiers to enable correction of the incorrect Merkle tree hash.

16. The non-transitory computer-readable medium of claim 15, wherein the resolution data includes a flag for each of the Merkle tree hashes for the intermediate layer indicating whether that Merkle tree hash is valid.

17. The non-transitory computer-readable medium of claim 15, wherein the resolution data includes full transaction identifiers for a portion of a bottom layer of the Merkle tree.

18. The non-transitory computer-readable medium of claim 15, wherein the received Merkle tree hashes include partial Merkle tree hashes.

19. The non-transitory computer-readable medium of claim 15, wherein the instructions, when executed, are to cause the one or more processors to repeat the receiving Merkle tree hashes and the sending resolution data for further layers of the Merkle tree until the receiving node has correct full transaction identifiers for calculating the block Merkle root for a block.

20. The non-transitory computer-readable medium of claim 15, wherein the instructions, when executed, are to cause the one or more processors to the send resolution data by at least:
- sending data identifying which of the received Merkle tree hashes is incorrect;
- receiving further Merkle tree hashes from the receiving node from a layer lower in the Merkle tree than the intermediate layer;
- identifying one of the further Merkle tree hashes not matching a corresponding locally-generated Merkle tree hash; and
- sending the one or more full transaction identifiers used in generating the corresponding locally-generated Merkle tree hash.

* * * * *